United States Patent
Sugabrahmam et al.

(10) Patent No.: US 9,575,858 B2
(45) Date of Patent: Feb. 21, 2017

(54) DYNAMIC PROTECTION OF STORAGE RESOURCES FOR DISASTER RECOVERY

(71) Applicant: VMware, Inc., Palo Alto, CA (US)

(72) Inventors: Giridharan Sugabrahmam, Santa Clara, CA (US); Ilia Langouev, Santa Cruz, CA (US); Aleksey Pershin, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 364 days.

(21) Appl. No.: 14/505,413

(22) Filed: Oct. 2, 2014

(65) Prior Publication Data

US 2016/0098324 A1 Apr. 7, 2016

(51) Int. Cl.
*G06F 7/02* (2006.01)
*G06F 17/30* (2006.01)
*G06F 11/20* (2006.01)
*G06F 3/06* (2006.01)
*G06F 9/50* (2006.01)

(52) U.S. Cl.
CPC ........... *G06F 11/2094* (2013.01); *G06F 3/065* (2013.01); *G06F 9/50* (2013.01); *G06F 17/30* (2013.01); *G06F 2201/815* (2013.01)

(58) Field of Classification Search
None
See application file for complete search history.

(56) References Cited

U.S. PATENT DOCUMENTS

| 2012/0260051 A1* | 10/2012 | Maki | G06F 3/0611 711/162 |
| 2013/0117744 A1* | 5/2013 | Klein | G06F 9/45533 718/1 |
| 2015/0242133 A1* | 8/2015 | Smith | G06F 3/0613 711/114 |
| 2016/0014200 A1* | 1/2016 | Murrish | G06F 3/0617 709/219 |

* cited by examiner

*Primary Examiner* — Bruce Moser
(74) *Attorney, Agent, or Firm* — Patterson & Sheridan LLP

(57) ABSTRACT

A recovery manager discovers replication properties of datastores stored in a storage array, and assigns custom tags to the datastores indicating the discovered replication properties. A user may create storage profiles with rules using any combination of these custom tags describe replication properties. The recovery manager protects a storage profile using a policy-based protection mechanism. Whenever a new replicated datastore is provisioned, the datastore is dynamically tagged with the replication properties of their underlying storage, and will belong to one or more storage profiles. The recovery manager monitors storage profiles for new datastores and protects the newly provisioned datastore dynamically, including any or all of the VMs stored in the datastore.

20 Claims, 4 Drawing Sheets

DYNAMIC PROTECTION OF STORAGE RESOURCES FOR DISASTER RECOVERY

BACKGROUND

Storage replication is a data protection strategy in which data objects (e.g., files, physical volumes, logical volumes, file systems, etc.) are replicated to provide some measure of redundancy. Storage replication may be used for many purposes, such as ensuring data availability upon storage failures, site disasters, or planned maintenance. Storage replication may be managed directly between storage systems, such as storage arrays, in an approach referred to as storage-based replication or array-based replication (ABR), in contrast to host-based replication.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
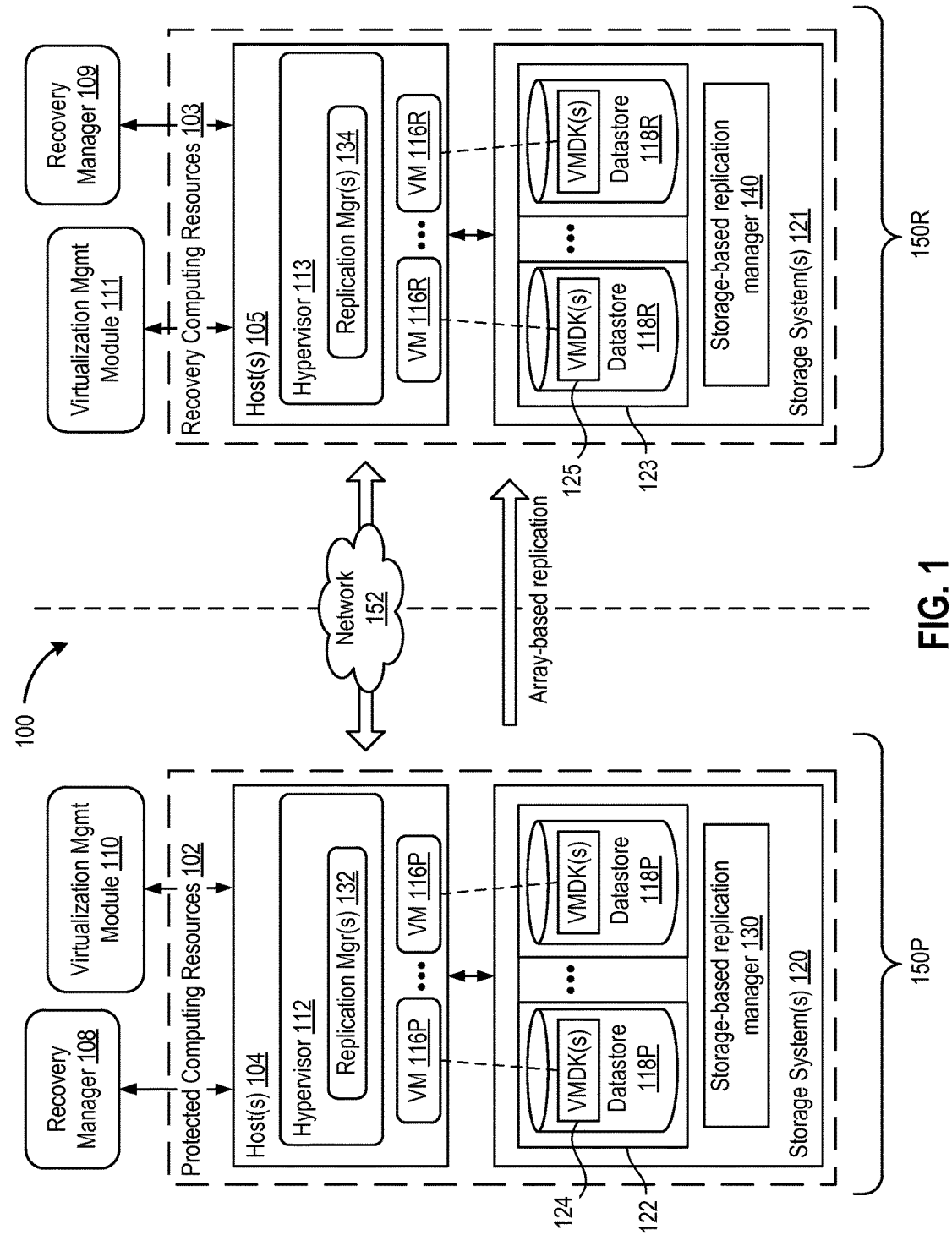
FIG. 1 is a block diagram that illustrates a computer system in which one or more embodiments may be utilized.

FIG. 1 is a block diagram that illustrates a computer system 100 in which one or more embodiments may be utilized. Computer system 100 includes a protected site 150P and a recovery site 150R communicatively connected by a network 152. Sites 150P, 150R include collections of computing resources that are physically and/or logically divided within computer system 100. As used herein, computing resources referred to as "protected" are computing resources, such as virtual machines, for which a duplicate set of computing resources (and data contained therein) is maintained in the event of a system crash or corruption, thereby preventing downtime or even an entire system from being lost due to failure of one or more components. This duplicate set of computing resources may be referred to as "recovery" resources maintained at a recovery site 150R. The process when recovery site 150R takes over operation in place of protected site 150P, for example, after declaration of a disaster, is referred to as a "failover" or a migration. A failback refers to the converse process of restoring services from recovery site 150R back to protected site 150P, for example, after the protected site has been restored and is ready to resume operation.

In one embodiment, protected site 150P includes protected computing resources 102, a recovery manager 108 and a virtualization management module 110. Similarly, recovery site 150R includes recovery computing resources 103, a recovery manager 109, and a virtualization management module 111. Computing resources 102, 103 can include computer systems, storage systems, networks and associated devices, and the like. Protected site 150P may be a datacenter containing protected virtual machines (VMs 116P), executing on protected computing resources 102, for which data is being replicated to recovery site 150R. An administrator can organize protected VMs 116P into protection groups. A "protection group" is a collection of VMs and datastores that is a logical unit of failover (from the user's perspective, for example, a protection group might contain a logical set of applications). Protection groups may be configured in recovery manager 108 by the user as a logical container of VMs that are replicated to a recovery site. Protected VMs 116P can be transferred from operating on the protected computing resources to recovery computing resources at recovery site 150R. Protected VMs 116P can be transferred between sites 150P and 150R in response to unplanned migration (e.g., resource failure, disaster, etc.) or planned migration (generally referred to as migration). Protected VMs on protected site 150P can be failed over to recovery site 150R. Protected VMs on recovery site 150R can be failed back to protected site 150P. The terms "failed over" and "failed back" encompass both planned and unplanned migrations of VMs between sites 150P and 150R.

Protected computing resources 102 include one or more host computers (i.e., host(s) 104) that execute one or more hypervisors 112, which include virtual machines (VMs) 116P that are protected. Recovery computing resources 103 include one or more host computers (i.e., host(s) 105) that execute one or more hypervisors 113, which include recovery VMs 116R that will become available after a failover of the corresponding protected VMs. Each of hypervisor 112 and 113 can be a "bare-metal" hypervisor, such as vSphere® ESXi™ commercially available from VMware, Inc. of Palo Alto, Calif. Alternatively, one or more of hypervisor(s) 112 and 113 can execute on top of an operating system (OS), which is executing on a host. Hypervisors 112 and 113 provide a software interface layer that abstracts computing hardware resources into virtualized hardware, enabling sharing of the computing hardware resources among virtual machines. Hypervisor 112 acts as an interface between VMs 116P and protected computing resources 102, and hypervisor 113 acts as an interface between VMs 116R and recovery computing resources 103. Hypervisors 112 and 113 may run on top of an operating system or directly on respective computing resources.

VMs 116P and 116R share hardware resources of protected computing resources 102 and recovery computing resources 103, respectively. Each VM typically includes a guest operating system (OS) and virtualized system hardware (not shown) implemented in software to emulate corresponding components of an actual computer system. VMs 116P are part of protected group(s) of VMs, and hence the computing resources shared by VMs 116P are referred to as "protected computing resources." VMs 116R represent VMs which will become available after a failover or disaster recovery, and hence the computing resources shared by VMs 116R are referred to as "recovery computing resources."

Each of host(s) 104 is coupled to one or more storage systems 120, and each of host(s) 105 is coupled to one or more storage systems 121. Storage systems 120, 121 can include one or more mass storage devices, associated networks, and the like. In one embodiment, storage systems 120, 121 may be storage arrays (sometimes referred to as disk arrays), which are storage systems typically containing multiple storage devices (e.g., disk drives), cache memory, and are configured to provide advanced functionality such as RAID, storage virtualization, and array-based replication.

Examples of storage arrays include network attached storage (NAS) arrays and storage area network (SAN) arrays. Storage system 120 stores protected datastores 118P, and storage system 121 stores recovery datastores 118R corresponding to protected datastores 118P. Datastores are logical containers, analogous to file systems, which hide specifics of each storage device and provide a uniform model for storing files that a hypervisor uses to run virtual machines. A datastore can store one or more virtual disks, which store files and data for guest operating systems and applications running in the virtual machines. A datastore can also store VM configuration file(s), file(s) that contain VM snapshot(s), and any other file used by a hypervisor to configure and run VMs. Datastores 118P store files for protected VMs 116P, and datastores 118R store files for recovery VMs 116R. Datastores 118P, 118R are abstracted from the underlying mass storage of storage systems 120, 121. For example, a given datastore can be stored on one or more logical storage devices 122 and 123, respectively, sometimes referred to as logical volumes or logical unit numbers (LUNs), which are, effectively, logical block storage devices exposed by the storage system. A given logical storage device of a storage system can store multiple datastores, and a datastore can span across multiple logical storage devices.

Computer system 100 includes a virtualization management module 110 that may communicate to the plurality of hosts 104. In one embodiment, virtualization management module 110 is a computer program that resides and executes in a central server, which may reside in computer system 100, or alternatively, running as a VM in one of hosts 104. One example of a virtualization management module is the vCenter® Server product made available from VMware, Inc. of Palo Alto, Calif. Virtualization management module 110 is configured to carry out administrative tasks for the computer system 100, including managing hosts 104, managing VMs running within each host 104, provisioning VMs, migrating VMs from one host to another host, load balancing between hosts 104, creating resource pools comprised of computing resources of hosts 104 and VMs 116P, modifying resource pools to allocate and de-allocate VMs and physical resources, and modifying configurations of resource pools. Virtualization management module 111 may be configured similarly.

In one or more embodiments, storage systems of computer system 100 may be configured to perform storage-based replication, also referred to as array-based replication, where replication of virtual machines is managed and run by the storage system itself rather than from inside the virtual machine(s), hypervisors, or service consoles of the virtualization management modules, as is the case with host-based replication. In one embodiment, storage system(s) 120 include storage-based replication manager(s) 130, and storage system(s) 121 include storage-based replication manager(s) 140. Storage-based replication managers 130, 140 can control replication of datastores and associated VMs between sites 150P and 150R. In another embodiment, hypervisor(s) 112 can include replication manager(s) 132, and hypervisor(s) 113 can include replication manager(s) 134. Replication managers 132, 134 can control replication of VMs between sites 150P and 150R. Some hypervisors can replicate individual VMs to existing datastores. Other hypervisors can replicate the VMs by replicating the datastores on which the VMs reside. Storage-based replication managers 130, 140 can operate together with (host-based) replication managers 132, 134, in place of replication managers 132, 134, or can be omitted in favor of only replication managers 132, 134.

Recovery manager 108 is configured to coordinate with a corresponding recovery manager 109 to perform disaster recovery operations on protected computing resources (e.g., VMs 116P, datastores 118P) of protected site 150P using corresponding recovery computing resources 103 (e.g., VMs 116R, datastores 118R) of recovery site 150R. In some embodiments, recovery managers 108, 109 may be executing as a virtual machine or on a physical server (not shown). In other embodiments, recovery managers 108,109 may execute as modules in hypervisors 112, 113. Recovery managers 108, 109 enable a user to plan the availability of virtual workloads in times of a disaster, for example, by enabling the user to recover their virtual workloads quickly when the production datacenter (i.e., protected site 150P) is unavailable. In one embodiment, recovery managers 108, 109 are configured to orchestrate a planned failover of virtual workloads along with the associated storage across sites 150P and 150R, a test failover of virtual workloads along with the associated storage on the recovery site 150R, or unplanned or disaster failover of virtual workloads along with the associated storage across sites 150P and 150R. An example recovery manager 108 that provides disaster recovery is vSphere® vCenter™ Site Recovery Manager™ commercially available from VMware, Inc. of Palo Alto, Calif.

In order to protect virtual workloads, a user may configure recovery managers 108, 109 with a set of replicated datastores that are critical for their business operations. Recovery manager 108 may discover these replicated datastores from storage system 120 and make the datastores available for disaster recovery protection. In every pair of replicated datastores, one datastore is the replication source and the other is the replication target. Data written to the source datastore is replicated to the target datastore on a schedule controlled by replication manager 130 of storage system 120. Datastores may be replicated independently (i.e., as standalone datastores) or as part of a consistency group.

A consistency group is defined as a set of replicated datastores for which the write order is preserved during a replication. As such, a consistency group can guarantee that the order of writes within the replica datastores will be the same as in the replicated datastores. In a simplified example, when a virtual disk is migrated from a replicated datastore A to another replicated datastore B at the protected site, the virtual disk is (essentially) written to datastore B, followed by a deletion of the old copy of the virtual disk at the datastore A. Using array-based replication, the storage system replicates these write operations to corresponding datastores A1 and B1. If datastores A and B are configured as part of the same consistency group, the storage system ensures that the old copy of the virtual disk at the replica datastore A1 is not deleted until after the virtual disk has been successfully written to replica datastore B1. Otherwise, a dangerous scenario might arise if the storage system deletes the old copy of the virtual disk at the replica datastore A1 before the virtual disk has been written to replica datastore B1, resulting in no datastore having a copy of the virtual disk for a period of time. In other words, every state of a target set of datastores existed at a specific time as the state of the source set of datastores. Informally, the datastores are replicated together such that when recovery happens using those datastores, software accessing the targets does not see the data in a state that the software is not prepared to deal with In operation, while protected VMs 116P are operating, recovery VMs 116R are not operating, and datastores 118P are being replicated to datastores 118R. In case of disaster recovery, initially none of VMs 116P and 116R are operating. Recovery managers 108, 109 can begin a disaster recovery workflow that makes datastores 118R available in order to bring online VMs 116R, effectively failing over VMs 116P to VMs 116R. After the disaster recovery workflow is complete, VMs 116R are operating in place of VMs 116P. The same process may works in reverse for failback of recovery VMs 116R to protected VMs 116P.

Storage-based replication managers 130, 140 may perform replication in a synchronous or asynchronous manner. In synchronous replication, any data written to the protected site are also written to the recovery site, and I/O acknowledgement is returned to the writer only after receiving acknowledgment from both sites. This approach, however, may suffer from performance and latency issues and often requires the recovery site to be physically proximate to the protected site to alleviate such latency issues. In asynchronous replication, subsequent I/O operations at the protected site are not held up by replicated I/O at the recovery site. Rather, asynchronous replication to the recovery site may occur based on a schedule or a constraint known as a Recovery Point Objective (RPO) that typically specifies an upper limit on the potential data loss upon a failure or disaster. The asynchronous approach improves performance, at the risk of data loss if the protected site fails before data have been replicated to the recovery site.

When a user (e.g., administrator) provisions a new replicated datastore 118P, there are typically several steps that need to be done to configure recovery manager 108 to enable disaster recovery protection of the newly provisioned datastore. In one approach, the user must either add, via recovery manager 108, the new datastore to one of existing protection groups or create a new protection group for the new datastore. Further, virtual machines residing on the new datastore would have to be configured for protection as well. As such, known approaches to disaster recovery protection have a high administrative burden and can risk the loss of disaster recovery or even data loss should a user forget to perform the required steps.

Accordingly, embodiments of the present disclosure provide a recovery manager configured to protect a storage profile using a policy-based protection mechanism. Whenever a new replicated datastore is provisioned, the datastore is tagged with the replication properties of their underlying storage, and will belong to one or more "storage profiles" protected by recovery manager 108. One example implementation of storage profile-based protection groups is described in further detail in U.S. patent application Ser. No. 14/473,984, filed Aug. 29, 2014, entitled "Storage Policy-Based Automation of Protection for Disaster Recovery" and is herein incorporated by reference.

The recovery manager monitors storage profiles for new datastores and protects the newly provisioned datastore dynamically, including any or all of the VMs stored in the datastore. When a datastore is removed from the storage system, the datastore is removed from disaster recovery protection. As such, a replicated datastore may be protected as soon as the datastore is provisioned, without expressly assigning VMs via user input as under prior approaches.

Figure 2:
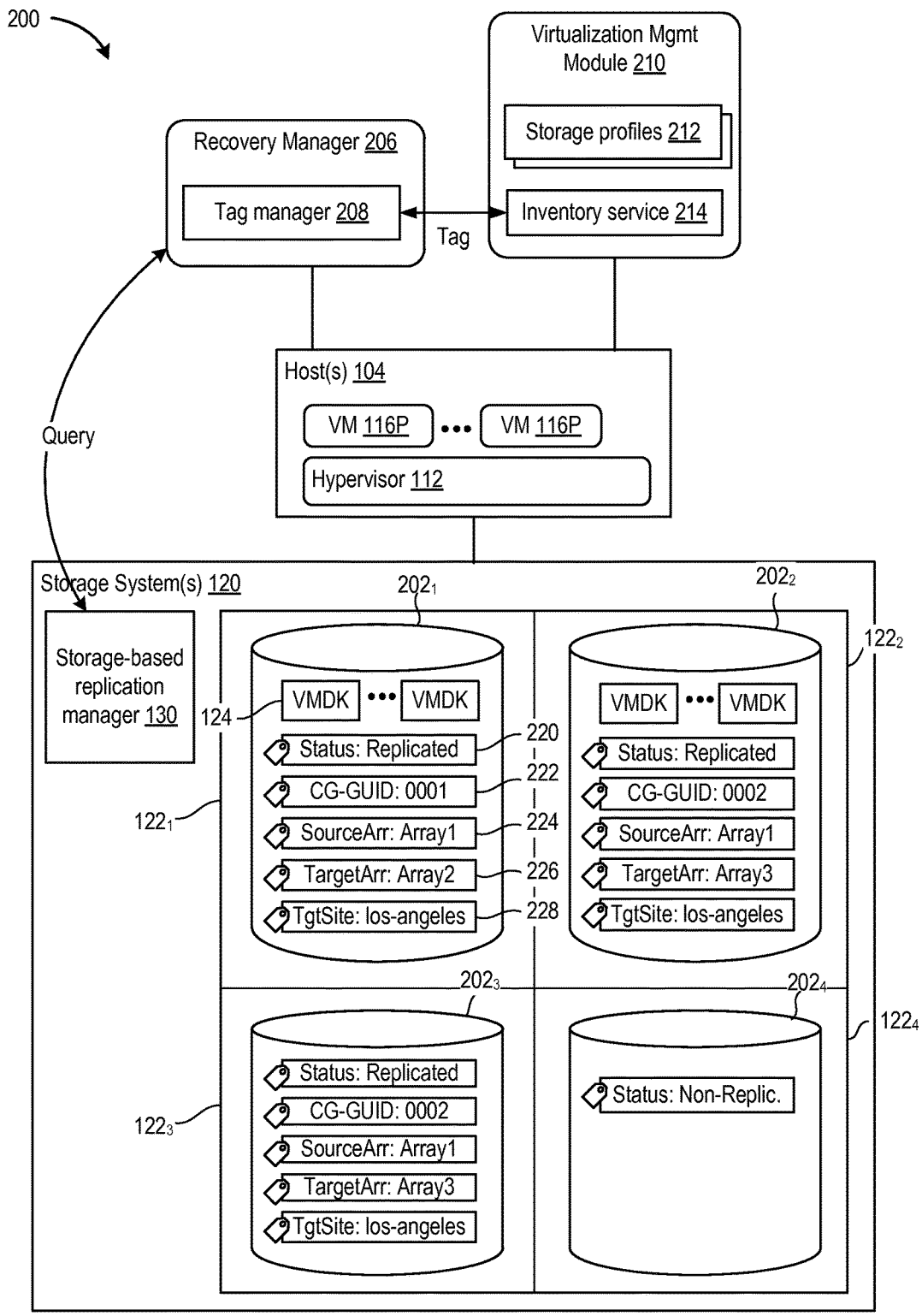
FIG. 2 is a block diagram depicting a computer system configured to dynamically assign tags to replicated datastores, according to one embodiment of the present disclosure.

FIG. 2 is a block diagram depicting a computer system 200 configured to dynamically assign tags to replicated datastores, according to one embodiment of the present disclosure. Computer system 200 is a protected site, similar to computer system 100 of FIG. 1, and includes a storage system 120 having a replication manager 130 configured to perform storage-based replication with a corresponding storage system (not shown) at a recovery site. Storage system 120 includes logical storage devices $122_1$, $122_2$, $122_3$ and $122_4$ having datastores $202_1$, $202_2$, $202_3$, $202_4$ (collectively referred to as datastores 202) formatted to store virtual machine files 124 associated with VMs 116P running on host 104.

Computer system 200 includes a recovery manager 206 configured to discover replication properties of all datastores 202 in a storage system 120. In one embodiment, recovery manager 206 includes a tag manager 208 configured to tag replicated datastores 202 with special tags indicating (storage-based) replication properties of the datastores. In some embodiments, recovery manager 206 may tag a datastore with a status tag indicating whether the datastore is replicated or not, with a consistency group tag indicating which consistency group the datastore belongs to, and array identifier tags indicating which storage array (e.g., storage system 120) the datastore belongs to and is replicated to, and a site identifier tag indicating which site (e.g., recovery site 150R the datastore is replicated to). Other types of special tags may be utilized.

Computer system 200 further includes a virtualization management module 210 having an inventory service 214. Inventory service 214 is configured to maintain an inventory of objects corresponding to physical and virtualized computing resources of system 200, including hosts 104, VMs 116P, datastores 202, logical storage devices 122, storage systems 120. The inventory maintained by inventory service 214 includes locations of each physical and virtualized computing resource, such as which datastore is stored in which logical storage device, and other properties associated with each physical and virtualized computing resource of system 200. Inventory service 214 is configured to handle queries for inventory objects and their associated objects. Inventory service 214 is configured to add, remove, and/or modify tags assigned to inventory objects, such as datastores, which can be used to categorize replication properties. In one embodiment, tag manager 208 of recovery manager acts as a proxy for adding and removing tags via inventory service 214 of virtualization management module 210. The tags are searchable metadata, and as such, inventory service 214 is configured to provide inventory objects and their replication properties based on queries for certain tags, for example, from recovery manager 206.

In one or more embodiments, virtualization management module 210 is configured to generate (e.g., in response to user input) and maintain one or more storage profiles 212. A storage profile 212 is an abstraction of a set of one or more datastores 202 that are treated as a single entity based upon common storage capabilities. For example, a user using virtualization management module 210 defines a storage profile for a defined performance characteristic and associates datastores that meet the performance characteristic with the storage profile. In one embodiment, a storage performance characteristic/capability is represented by a key-value pair, where the key is a specific property that the logical storage device can offer and the value is a metric, or a range, that the logical storage device guarantees for a provisioned object, such as a virtual machine metadata object or a virtual disk. For example, storage performance capabilities include capacity, storage space reservation, failure tolerance, cache size, performance speed, availability, redundancy, etc.

Virtualization management module 210 may associate VMs 116P, as well as datastores 202 on which VMs 116P are stored, with one or more storage profiles 212. In one embodiment, VMs and datastores are associated with a storage profile 212 through one or more rules of storage profile 212 that use, as criteria, the special tags indicating (storage-based) replication properties of the datastores. For example, an administrator uses virtualization management module 210 to create a storage profile that contains all replicated datastores 202 by using a rule set with the status tag (e.g., "Replicated") as a criteria. In another example, the administrator uses virtualization management module 210 to create a different storage profile that contains replicated datastores from a specific consistency group by specifying the particular consistency group identifier in the rule set. Larger storage profiles 212 may be associated with datastores replicating to a specific storage system or recovery site using rules that have the array and site identifier tags as criteria for association with the storage profile.

Figure 3:
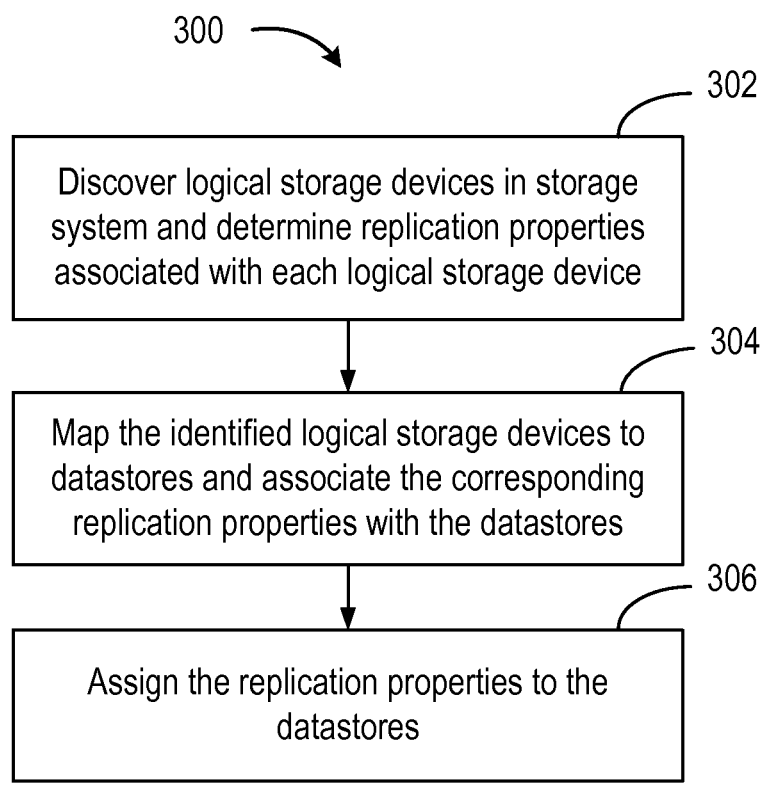
FIG. 3 is a flow diagram depicting a method for tagging a datastore with replication properties, according to one embodiment of the present disclosure.

FIG. 3 is a flow diagram depicting a method 300 for tagging a datastore with replication properties, according to one embodiment of the present disclosure. While method 300 is described in conjunction with components of the system shown in FIG. 2, other components in computer system 200 may perform the steps of method 300, as well as other systems may perform the described method.

At step 302, recovery manager 206 discovers one or more logical storage devices (e.g., devices $122_1$, $122_2$, $122_3$, $122_4$) of storage system 120 and determines one or more replication properties associated with each logical storage device 122. In one embodiment, recovery manager 206 communicates with storage system 120 via a vendor-supported common interface referred to as a storage replication adapter (SRA). Recovery manager 206 may query storage system 120 (e.g., via SRA) for a device configuration, which includes identification of any logical storage devices 122 stored on storage system 120 and their associated replication properties. Recovery manager 206 may query storage system 120 periodically, for example, once every 24 hours, although any periodicity may be used. Using periodic scans of storage system 120, recovery manager 206 may discover logical storage devices 122 which may have been newly added, removed, or changed since a prior scan. Recovery manager 206 may also query storage system 120 in response to user input that forces a rescan of storage system 120. In some embodiments, recovery manager 206 may query storage system to perform this datastore discovery step in response to a new datastore being added, removed, or modified, as notified by inventory service 214.

In one or more embodiments, recovery manager 206 receives a replication topology of logical storage devices 122 indicating which of (if any) logical storage devices 122 are configured for storage-based replication, and other metadata associated with replication. If storage system 120 supports consistency groups, storage system 120 may also report which consistency groups (if any) each of logical storage devices 122 belongs to. As used herein, a consistency group refers to a set of logical storage devices for which the write order is preserved during replication. In one embodiment, storage system 120 may provide to recovery manager 206 an array identifier associated with (source) storage system 120 and an array identifier associated with (target) storage system 121 to which the particular logical storage device of storage system 120 is replicated. Storage system 120 may provide to recovery manager 206 a site identifier associated with recovery site 150R to which the particular logical storage device of storage system 120 is replicated. It is noted that other types of replication-related properties may be retrieved from storage system 120.

At step 304, recovery manager 206 maps logical storage devices 122 of storage system 120 to datastores 202 stored therein, and associates the corresponding replication properties with datastores 202. Recovery manager 206 may query inventory service 214 to determine which datastores 202 are stored in which logical storage device(s) 122 or portions of logical storage devices 122. In one embodiment, a datastore is deemed replicated if all of its underlying logical storage device(s) 122 are configured for replication. This all-or-nothing principle may be applied to the other replication properties of datastores. For example, a datastore is deemed to be a member of a given consistency group if all of its underlying logical storage device(s) are members of that consistency group.

At step 306, recovery manager 206 assigns the replication properties, if any, to datastores 202. In one embodiment, recovery manager 206 assigns one or more tags to datastores 202 indicating the associated replication properties (if any). In one embodiment, tag manager 208 of recovery manager 206 directs inventory service 214 to add one or more custom tags to inventory objects corresponding to the mapped datastores 202 indicating the associated replication properties. In an alternative embodiment, recovery manager 206 writes the one or more tags directly to datastore 202, such that the tags are accessible to other components within system 200 that can access datastore 202, and are replicated along with VM data to recovery site 150R.

In one embodiment, recovery manager 206 tags all replicated datastores with a replication status tag 220 (e.g., Status="Replicated"). Recovery manager 206 tags all datastores that are part of a consistency group with a consistency group tag 222 which contains a unique group identifier ("<Consistency-Group-GUID>"). In this way, all datastores that belong to the same consistency group will have the same tag assigned to them. Similarly, recovery manager 206 tags each replicated datastore with a source array tag 224 and target array tag 226 which contain unique array identifiers for storage system 120 and a corresponding storage system (e.g., storage system 121) the datastore is replicated from and to, respectively. In alternative embodiments, the source array tag and target array tag may be encoded in an array pair identifier (e.g., "<sourceId>:::<targetId>"). Recovery manager 206 may tag replicated datastores with a site tag 228 associated with a recovery site (e.g., recover site 150R). The tags assigned during step 306 may be categorized in inventory service 214 as being related to replication, so as to distinguish from other types of tags that might be assigned to the datastores and facilitate easy retrieval later on. The tag category of the assigned tags may be a distinct field of metadata, or in other embodiments, may be specified using a predetermined prefix in the tag name (e.g., "SRM-_____") that can be text searched. In some embodiments, a portion of the identifiers may contain a text value, for example, a consistency group label name in the case of consistency group identifiers, which can be used to search and/or match for the group identifiers in a rule set.

As such, recovery manager 206 discovers existing datastores and the corresponding logical storage devices 122 configured for array-based replication. For example, a user may have used virtualization management module 210 to create a datastore $202_1$ on logical storage device $122_1$, which has been already configured to array-based replication with a corresponding logical storage device (e.g., logical storage device 123) at recovery site 150R.

In the example shown in FIG. 2, recovery manager 206 retrieves replication properties for logical storage device $122_1$ (on which datastore $202_1$ is stored) indicating that device $122_1$ has been configured for array-based replication with a storage array "Array2" at a recovery site in Los Angeles, Calif. Tag manager 208 of recovery manager 206 assigns tags to datastore $202_1$ with a replication status tag 220 indicating datastore $202_1$ is configured for storage-based replication (i.e., "Status: Replicated"), with a consistency group tag 222 specifying the identifier associated with Consistency Group 1 (e.g., "CG-GUID: 0001"), with a pair of array tags 224, 226 specifying identifiers associated with storage system 120 and target storage system 121 (e.g., "SourceArr: Array1", "TargetArr: Array2"), with a target site tag 228 specifying the identifier associated with the recovery site in Los Angeles (e.g., "TgtSite: los-angeles").

In another example, recovery manager 206 discovers the plurality of logical storage devices 122, which includes first logical storage device $122_1$ described above, as well as a second logical storage device $122_2$ and third logical storage device $122_3$ configured for array-based replication with another storage array "Array3" at the recovery site in Los Angeles and belonging to a different Consistency Group 2, and a fourth logical storage device $122_4$ which is not replicated. Recovery manager 206 then determines that datastore $202_2$ is stored within device $122_2$, and associates the replication properties of device $122_2$ (e.g., replication enabled, Consistency Group 2, target array Arry3) with datastore $202_2$ itself. A similar mapping is performed to associate replication properties of device $122_3$ with datastore $202_3$. Tag manager 208 of recovery manager 206 tags datastore $202_2$ with a replication status tag 220 indicating datastore $202_2$ is configured for storage-based replication (i.e., "Status: Replicated"), with a consistency group tag specifying the identifier associated with Consistency Group 2 (e.g., "CG-GUID: 0002"), and a pair of array tags specifying the identifier associated with storage system 120 and the target storage system Array3 (e.g., "SourceArr: Array1", "TargetArr: Array3"), with a target site tag specifying the identifier associated with the recovery site in Los Angeles (e.g., "TgtSite: los-angeles"). Tag manager 208 assigns tags to third datastore $202_3$ in a similar manner as shown in FIG. 2. It is noted that fourth datastore $202_4$ is determined to have no associated replication properties, and as such need not be tagged. In some embodiments, the non-replicated status of fourth datastore $202_4$ may be made explicit with a "Status: Non-Replicated" tag, as shown in FIG. 2.

Recovery manager 206 keeps tags of datastores 202 up-to-date by monitoring the replication topology reported by storage system 120 (e.g., as in step 306). For example, when the replication properties of logical storage device $122_4$ change (e.g., to turn on replication), recovery manager 206 will react accordingly and add/remove tags to datastore $202_4$ as necessary.

Figure 4:
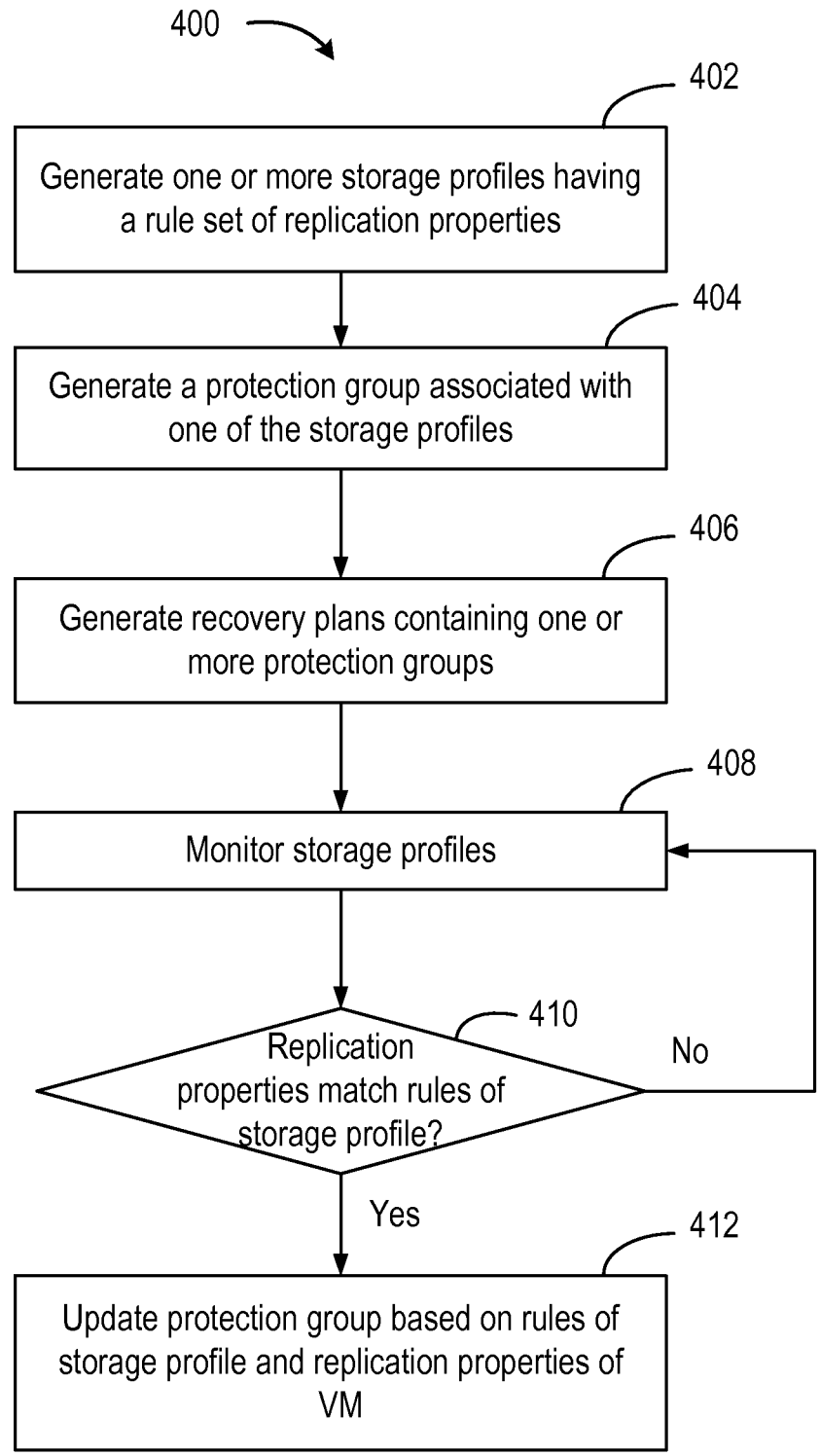
FIG. 4 is a flow diagram depicting a method for protecting storage resources for disaster recovery, according to one embodiment of the present disclosure.

FIG. 4 is a flow diagram depicting a method 400 for protecting storage resources for disaster recovery, according to one embodiment of the present disclosure. While method 400 is described in conjunction with components of the system shown in FIG. 2, other components in computer system 200 may perform the steps of method 400, as well as other systems may perform the described method.

Method 400 begins at step 402, where virtualization management module 210 generates one or more storage profiles 212 having a rule set of replication properties. Virtualization management module 210 may generate storage profiles 212 in response to user input, for example, via a user interface providing a selection of common pre-defined rules or input fields for defining custom rules. The rule set may include a plurality of rules that specify a replication property (e.g., array identifier), a condition operator (e.g., "contains", "does not contain", "equals"), and a conditional value (e.g., "Array1"). The rule set may specify a datastore satisfies the rule set so long as the datastore meets any of the rules (i.e., at least one), or alternatively, if the datastore meets all of the rules.

At step 404, recovery manager 206 generates one or more protection groups associated with one of the storage profiles. Recovery manager 206 may generate the protection groups in response to user input. In one embodiment, recovery manager 206 may determine an initial set of VMs and datastores to include in the protection group associated with particular storage profile based on which VMs and datastores have assigned replication properties (e.g., as tagged in method 300) that match the rule set of the particular storage profile.

At step 406, recovery manager 206 generates recovery plans containing one or more protection groups, e.g., in response to user input. In some embodiments, the same protection group may belong to multiple recovery plans. A recovery plan is a container of one or more protection groups (e.g., groups of VMs and logical storage devices) to be failed over together in a single workflow. In one embodiment, the recovery plan includes a start up order, priority order, or other customizations for the implementation of a recovery. For example, protection groups and/or individual virtual datacenter entities may be assigned priority values such that they are recovered in priority order. At this point, configuration actions have been completed and ongoing monitoring may begin. In one embodiment, should a failover be initiated for a recovery plan (having a particular protection group), recovery manager 206 fails over all VMs and datastores that are known to the recovery manager at that time as being part of the particular protection group.

At step 408, recovery manager 206 monitors the storage profiles for VMs and datastores that have changes to their assigned replication properties (if any). In one embodiment, recovery manager 206 dynamically adds or removes VMs and datastores from the corresponding protection groups and recovery plans based on the assigned replication properties. Recovery manager 206 may periodically query virtualization management module 110 for a list of VMs in a storage profile 212 and a list of datastores 202 that match rule sets of storage profile 212. In some embodiments, recovery manager 206 may query virtualization management module 110 in response to a notification received by recovery manager 206 indicating that one or more VMs or datastores have been provisioned, deleted, or otherwise modified. If new VMs or datastores are discovered, recovery manager 206 may dynamically protect the discovered VMs and datastores in a corresponding protection group.

During this monitoring step, a user may modify the recovery plan (e.g., via a user interface of recovery manager 206) and configure recovery settings for VMs in the recovery plan, for example, priorities, scripts, and IP customization etc. These recovery settings may be set to a default value when a VM is initially added to the recovery plan responsive to being discovered in the storage profile associated with a protection group that belongs to that recovery plan.

In one embodiment, at step 410, recovery manager 206 determines whether there are any new datastore(s) with replication properties that match one or more rules of a storage profile 212. In one embodiment, recovery manager 206 requests the virtualization management module 210 to evaluate whether tags assigned to the new datastore(s) satisfy one or more rules of storage profile 212. For example, virtualization management module 210 may evaluate a rule set of a storage profile which specifies one of the replication properties contains a pre-defined value. If a new datastore is discovered, at step 412, recovery manager 206 associates the datastore with the protection group corresponding to the storage profile based on the matching rule. Otherwise, recovery manager 206 may return to step 408 and continue to monitor the storage profiles for VMs and datastores. As such, to discover new and/or deleted datastores, recovery manager 206 queries virtualization management module 210 for a list of datastores that match the storage profile's rule sets, compare that retrieved list with the list of datastores already protected in the protection group, and then update the protection group accordingly. A similar process occurs for new and/or deleted VMs associated with the storage profile. In one embodiment, recovery manager 206 updates a protection group to add a datastore and any VMs stored in the datastore based on a match of the rules of a storage profile and replication properties of the datastore. In other cases, recovery manager 206 updates a protection group to remove a datastore and any VMs stored in the datastore based on a determination that the replication properties of the datastore no longer match the rules of the corresponding storage profile.

In one embodiment, recovery manager 206 determines the set of datastores associated with the storage profile, and further determines the set of virtual machines (VMs) stored in the set of datastores. In some embodiments, virtualization management module 210 may query inventory service 214 for any datastores having tags that satisfy the rule sets of the storage profiles. Recovery manager 206 then retrieves the set of datastores associated with a given storage profile, and adds the set of datastores and the set of VMs to one or more recovery plans based on the association with the storage profile.

In one example, one storage profile configured to contain all replicated datastores may include a rule set specifying datastores belonging to the storage profile shall have a tag indicating a replicated status (e.g., "Status=Replicated"). Upon evaluating such a rule set using the example shown in FIG. 2, virtualization management module 210 determines that datastores $202_1$, $202_2$, and $202_3$ (but not $202_4$) match the rule set and adds those datastores to the storage profile. If a protection group has been set up linking to the storage profile, recovery manager 206 dynamically adds datastores $202_1$, $202_2$, and $202_3$ and VMs stored on datastores $202_1$, $202_2$, and $202_3$ to the protection group and to all recovery plans the protection group belongs to, based on the association with the storage profile.

In another example, a different storage profile configured to contain replicated datastores from a specific consistency group may include a rule set specifying datastores belonging to the storage profile shall have a tag indicating a particular consistency group identifier (e.g., "CG-GUID=0002"). Upon evaluating this rule set, virtualization management module 210 adds datastores $202_2$ and $202_3$ to the storage profile based on the tag matches. Recovery manager 206 dynamically adds datastores $202_2$ and $202_3$ and VMs stored on $202_2$ and $202_3$ to a recovery plan based on the associated with the storage profile.

When the user creates a storage profile, the storage profile presents the user's intent to include into the storage profile any datastores that match the given set of criteria (e.g., tags in rule sets). When a new VM is being provisioned into a storage profile, virtualization management module 210 evaluates the storage profile criteria against all datastores in the system, assembles a list of matching datastores and then picks the best datastore from that list (i.e. with the most free space) and provisions the VM into that datastore. The actual set of datastores that match a profile may be changing dynamically throughout operation of system 200. To add a datastore to a profile, the user can simply assign the correct tags to the datastore (assuming the storage profile is configured to use tags to select datastores). The next time a user provisions a VM into that storage profile, system 200 notices the new datastore and may use the new datastore to provision the VM. This activity may happen outside of the tagging activities performed by recovery manager 206 (e.g., as described in method 300).

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance.

Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

What is claimed is:

1. A method for protecting storage resources for disaster recovery, the method comprising:
    retrieving replication properties associated with a first logical storage device from a first storage system, wherein the first storage system configured to perform array-based replication with a corresponding second storage system;
    assigning the retrieved replication properties to a datastore stored in the first logical storage device, wherein the datastore comprises a logical container configured to store virtual machine files;
    associating the datastore with a storage profile based on a determination that the replication properties match a rule set of the storage profile; and
    adding the datastore associated with the storage profile to a protection group configured to provide disaster recovery protection of the datastore from a protected site to a recovery site.

2. The method of claim 1, wherein the storage profile is an abstraction of a set of one or more datastores that are treated as a single entity based upon common storage capabilities.

3. The method of claim 1, wherein assigning the retrieved replication properties to the datastore further comprises:
    querying the first storage system for storage-based replication properties of one or more logical storage devices of the first storage system;
    mapping the storage-based replication properties of the one or more logical storage devices to a plurality of datastores; and
    assigning tags to the datastore indicating the mapped storage-based replication properties.

4. The method of claim 1, wherein the rule set of the storage profile specifies one or more of the replication properties.

5. The method of claim 1, wherein the determination that the replication properties match the rule set of the storage profile comprises a determination that a replicated status tag of the datastore matches the rule set of the storage profile specifying a replicated status.

6. The method of claim 1, wherein the retrieved replication properties assigned to the datastore include at least one of a status indicating whether the associated datastore is configured for storage-based replication, and a consistency group identifier indicating a consistency group the associated datastore belongs to.

7. The method of claim 1, wherein the retrieved replication properties assigned to the datastore include at least one of a source array identifier indicating the first storage system that the associated datastore is stored on, a target array identifier indicating the second storage system that the associated datastore is replicated to, and a target site identifier indicating the recovery site.

8. A non-transitory computer readable storage medium having stored thereon computer software executable by a processor, the computer software embodying a method for protecting storage resources for disaster recovery, the method comprising:
    retrieving replication properties associated with a first logical storage device from a first storage system, wherein the first storage system configured to perform array-based replication with a corresponding second storage system;
    assigning the retrieved replication properties to a datastore stored in the first logical storage device, wherein the datastore comprises a logical container configured to store virtual machine files;
    associating the datastore with a storage profile based on a determination that the replication properties match a rule set of the storage profile; and
    adding the datastore associated with the storage profile to a protection group configured to provide disaster recovery protection of the datastore from a protected site to a recovery site.

9. The non-transitory computer readable storage medium of claim 8, wherein the storage profile is an abstraction of a set of one or more datastores that are treated as a single entity based upon common storage capabilities.

10. The non-transitory computer readable storage medium of claim 8, wherein the method comprising assigning the retrieved replication properties to the datastore further comprises:
    querying the first storage system for storage-based replication properties of one or more logical storage devices of the first storage system;
    mapping the storage-based replication properties of the one or more logical storage devices to a plurality of datastores; and
    assigning tags to the datastore indicating the mapped storage-based replication properties.

11. The non-transitory computer readable storage medium of claim 8, wherein the rule set of the storage profile specifies one or more of the replication properties.

12. The non-transitory computer readable storage medium of claim 8, wherein the determination that the replication properties match the rule set of the storage profile comprises a determination that a replicated status tag of the datastore matches the rule set of the storage profile specifying a replicated status.

13. The non-transitory computer readable storage medium of claim 8, wherein the retrieved replication properties assigned to the datastore include at least one of a status indicating whether the associated datastore is configured for storage-based replication, and a consistency group identifier indicating a consistency group the associated datastore belongs to.

14. The non-transitory computer readable storage medium of claim 8, wherein the retrieved replication properties assigned to the datastore include at least one of a source array identifier indicating the first storage system that the associated datastore is stored on, a target array identifier indicating the second storage system that the associated datastore is replicated to, and a target site identifier indicating the recovery site.

15. A computer system for protecting of storage resources for disaster recovery, the computer system comprising:
    a first storage system configured to perform array-based replication with a corresponding second storage system; and
    a processor programmed to carry out the steps of:

retrieving replication properties associated with a first logical storage device from the first storage system;

assigning the retrieved replication properties to a datastore stored in the first logical storage device, wherein the datastore comprises a logical container configured to store virtual machine files;

associating the datastore with a storage profile based on a determination that the replication properties match a rule set of the storage profile; and adding the datastore associated with the storage profile to a protection group configured to provide disaster recovery protection of the datastore from a protected site to a recovery site.

16. The computer system of claim 15, wherein the processor programmed to carry out the step of assigning the retrieved replication properties to the datastore is further programmed to carry out the steps of:

querying the first storage system for storage-based replication properties of one or more logical storage devices of the first storage system;

mapping the storage-based replication properties of the one or more logical storage devices to a plurality of datastores; and assigning tags to the datastore indicating the mapped storage-based replication properties.

17. The computer system of claim 15, wherein the rule set of the storage profile specifies one or more of the replication properties.

18. The computer system of claim 15, wherein the determination that the replication properties match the rule set of the storage profile comprises a determination that a replicated status tag of the datastore matches the rule set of the storage profile specifying a replicated status.

19. The computer system of claim 15, wherein the retrieved replication properties assigned to the datastore include at least one of a status indicating whether the associated datastore is configured for storage-based replication, and a consistency group identifier indicating a consistency group the associated datastore belongs to.

20. The computer system of claim 15, wherein the retrieved replication properties assigned to the datastore include at least one of a source array identifier indicating the first storage system that the associated datastore is stored on, a target array identifier indicating the second storage system that the associated datastore is replicated to, and a target site identifier indicating the recovery site.

* * * * *